Figure 1:
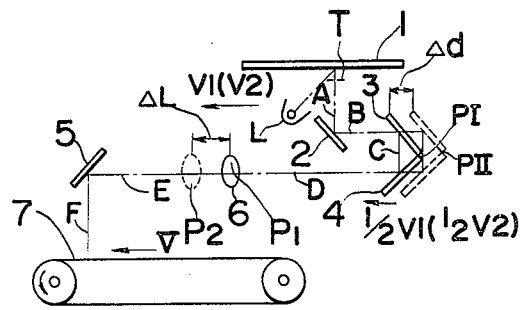

United States Patent [19]
Doi et al.

[11] 3,884,574
[45] May 20, 1975

[54] PLURAL MAGNIFICATION COPYING APPARATUS

[75] Inventors: Yasuhiko Doi; Hiroshi Ikeda, both of Toyokawa, Japan

[73] Assignee: Minolta Camera Kabushiki Kaisha, Osaka, Japan

[22] Filed: Feb. 21, 1974

[21] Appl. No.: 444,367

[30] Foreign Application Priority Data
Feb. 27, 1973 Japan.............................. 48-24993

[52] U.S. Cl...................................... 355/66; 355/8
[51] Int. Cl. .......................................... G03b 27/70
[58] Field of Search............................. 355/8, 65, 66

[56] References Cited
UNITED STATES PATENTS
3,614,222  10/1971  Post et al................................. 355/8

Primary Examiner—John M. Horan
Attorney, Agent, or Firm—Wenderoth, Lind & Ponack

[57] ABSTRACT

The disclosure is directed to a copying apparatus permitting copies of originals at a plurality of magnifications. Image rays from an original to be copied are directed onto a first mirror assembly, to a second mirror assembly, through a lens to a fixed mirror, and onto an exposure surface, the exposure surface, and first and second mirror assemblies being moved in the same direction at speeds which are in definite ratios. The second mirror assembly and lens may each be set to different initial positions, to produce different lens to original and lens to exposure surface ratios, and, depending on the initial settings of the lens and second mirror assembly, the first and second mirror assemblies are driven at different speed ratios relative to the speed of the exposure surface.

9 Claims, 13 Drawing Figures

PATENTED MAY 20 1975　3,884,574

SHEET 1 OF 3

(a)　　　(b)

(a)

(b)

PLURAL MAGNIFICATION COPYING APPARATUS

The present invention relates to a copying apparatus, and more particularly to a copying apparatus permitting copies of original documents to be obtained at different magnifications.

There are known copying apparatus in which light rays reflected from successive portions of an original document are directed through an exposure aperture, which is moved past the document, onto a first mirror, which is also moved past the document, generally by the same means as that moving the aperture, and these light rays are then reflected from the first mirror onto other mirrors and through a lens, onto a sensitized material, which is moved in the same direction as the exposure aperture, whereby images of successive portions of the original document are obtained on successive portions of the sensitized material, to produce a copy of the document. A requirement in producing a copy of a document by this process is that distances over which light rays travel from the document to the lens and from the latter to the sensitized material must be kept constant, or at least in a constant ratio. It is known to meet this requirement by the provision of a stationary lens, and of a first and a second mirror assembly which direct exposure rays from a document and which are moveable with respect to one another, the second mirror assembly being moved at half the speed of the first mirror assembly, whereby the document to lens distance is maintained constant. However, such copying apparatus permits copies of documents at only one magnification. If copies of documents at different magnifications with such apparatus, it is necessary to provide a plurality of lenses having different magnifying powers, and to substitute one lens for another, according to the degree of magnification at which it is required to obtain copies of a document. This process presents the disadvantages that the provision of several lenses is extremely expensive, manipulation of the apparatus becomes complicated and also there is an increased possibility of misalignment of lenses. In other copying apparatus, it is known to make copies of documents at different magnifications by moving a lens simultaneously with reflecting mirrors, the lens generally being moved a much smaller distance than the mirrors. Such apparatus has the disadvantage that to make necessary adjustments to maintain correct lengths of light paths, a large apparatus is required.

It is accordingly an object of the present invention to provide an improved copying apparatus permitting copies of documents at different magnifications.

It is another object of the invention to provide a copying apparatus permitting different magnifications which is compact and requires only one lens.

It is a further object of the invention to provide a copying apparatus permitting different magnifications which is simple to operate.

In achieving these and other objects, there is provided, according to the present invention, a copying apparatus comprising first and second mirror assemblies moveable parallel to a fixed document rest, on which a document to be copied remains stationary. Exposure rays coming from a document and passing through a moving aperture are directed by the first and second mirror assemblies through a lens onto a fixed mirror and thence onto a copying material which is also moved parallel to the document being copied and in the same direction as the first and second mirror assemblies. The second mirror assembly is moved at half the speed of the first mirror assembly, to maintain the length of the light path from the document to the lens constant, and the first mirror assembly is moved at a speed which is in a definite relation to the speed at which the copying material is moved. The lens remains stationary. To obtain a copy of a document at a different magnification, the initial settings of the lens and second mirror assembly are changed, to obtain a new ratio of lens to object and lens to image distances, after which a copy is obtained in the same manner as described above, except that the relation between the speed of the first mirror assembly (and hence the second mirror assembly) and of the copying material is changed, the speed of the latter being constant for copies obtained at all magnifications. With the copying apparatus of the invention no special procedure is required to obtain copies of different magnifications, but it is simply necessary to actuate suitably identified push-buttons on the exterior of the apparatus. Adjustments to the ratio of the lens to object and lens to image distances are made by moving the lens and second mirror assembly towards or away from one another on the same plane, which provides economy of space and permits a compact copying apparatus.

Figure 2:
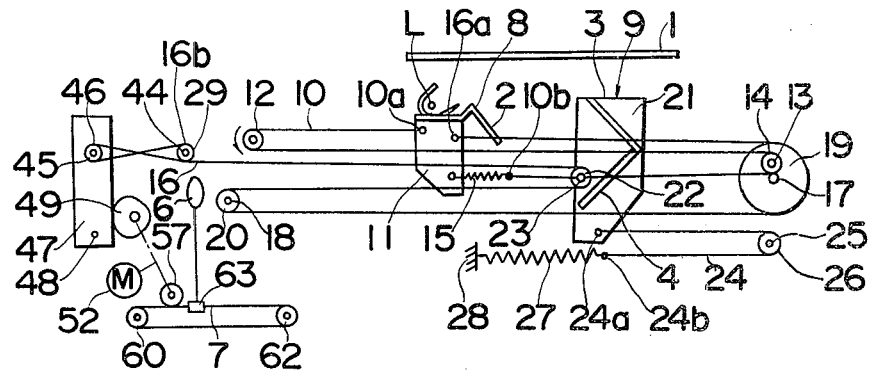
Figure 3:
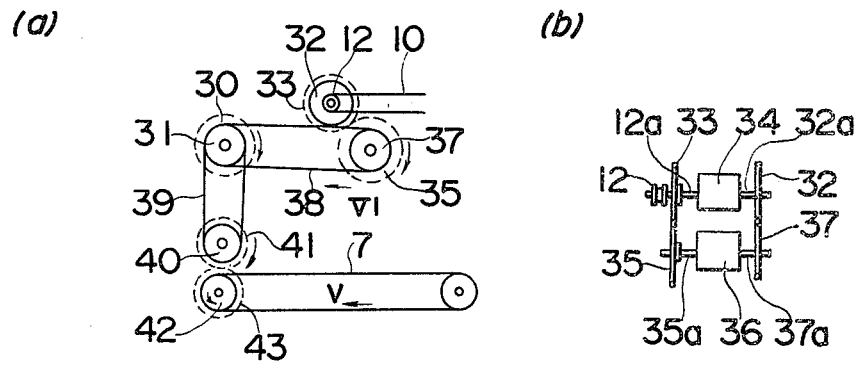
Figure 5:
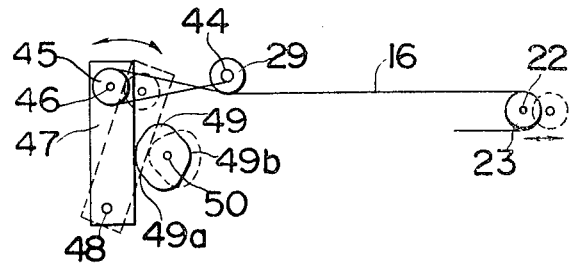
Figure 4:
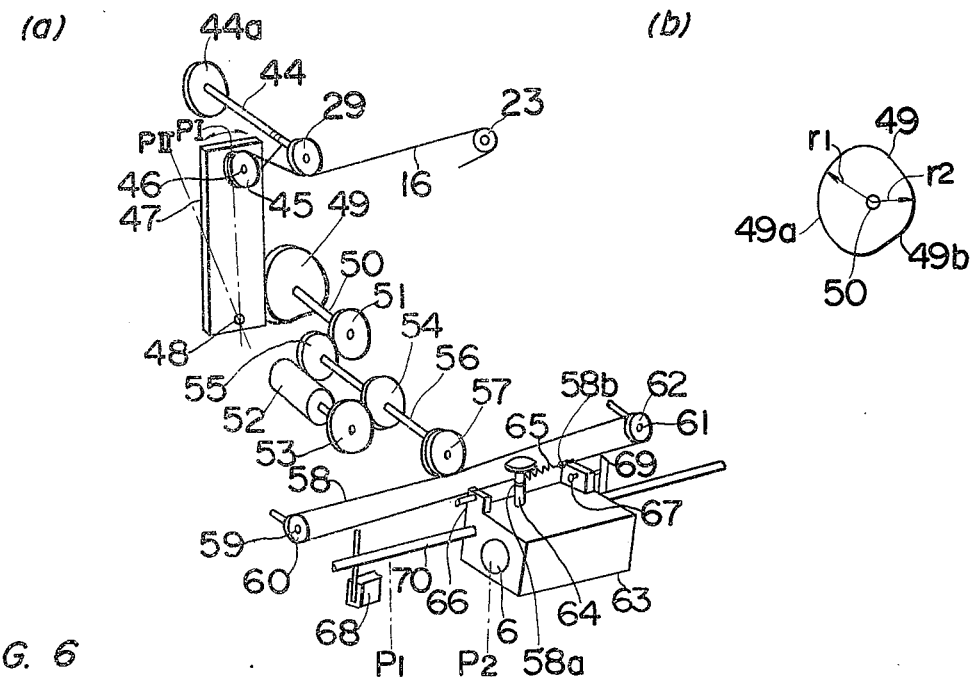
Figure 6:
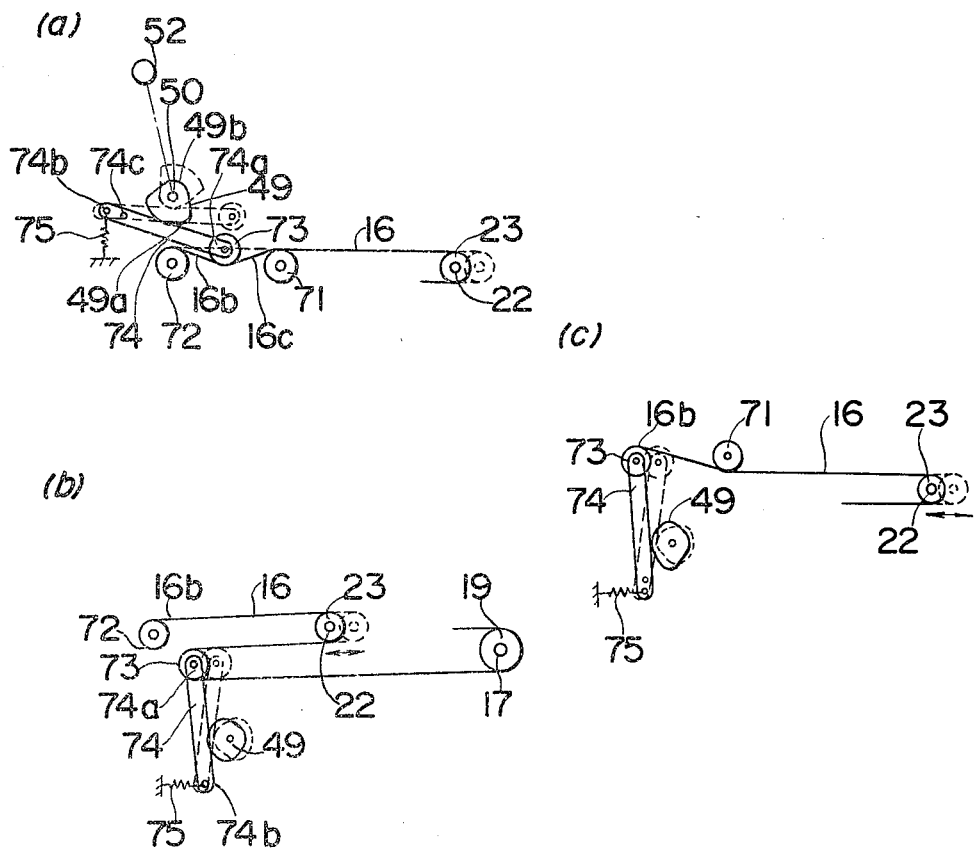
Figure 7:
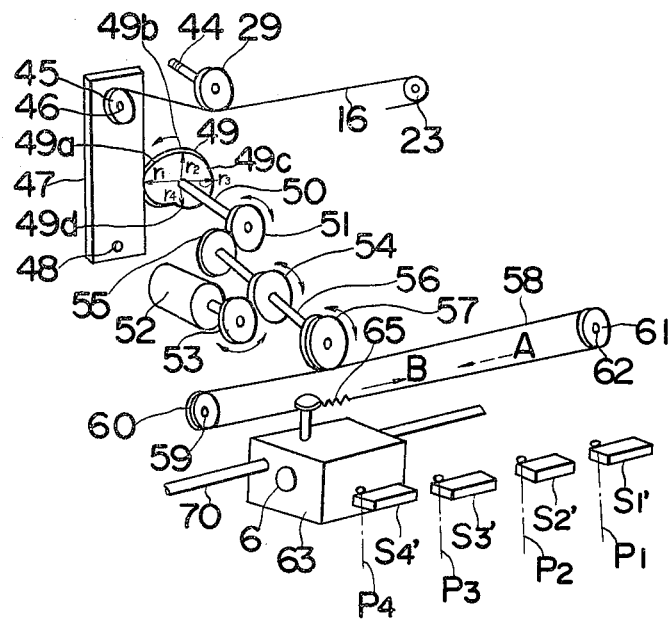
Figure 8:
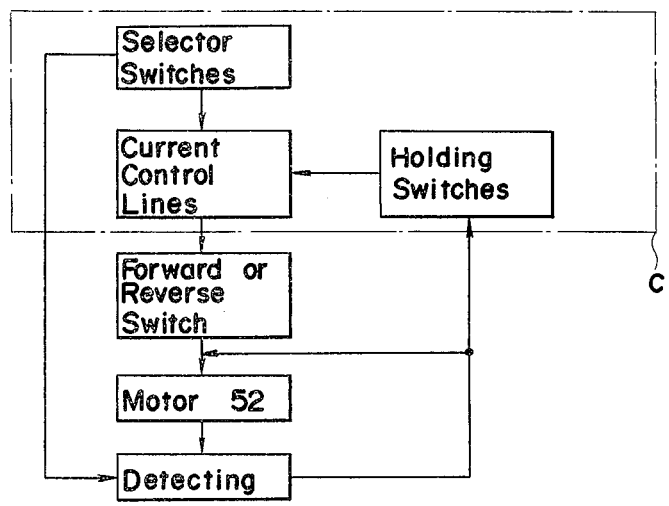
Figure 8:
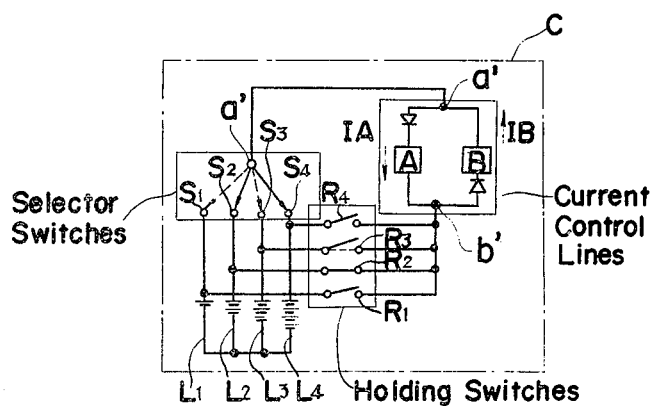

A better understanding of the present invention may be had from the following full description when read in conjunction with the attached drawings. In the drawings, in which like numerals refer to like parts, FIG. 1 illustrates schematically the principle of a copying apparatus of the invention;

FIG. 2 is a schematic illustration of an essential portion of a copying apparatus of the invention;

FIG. 3 (a), (b) show schematically a drive means for driving a mirror carriage and copying material employed in the apparatus of FIG. 2, FIG. 4 (a), (b) is a schematic view of main parts of an initial setting means employed in the apparatus of FIG. 2, FIG. 5 is an explanatory drawing showing the operation of a cam means shown in FIG. 4;

FIG. 6 (a), (b), (c) are explanatory drawings of modifications of the cam means shown in FIG. 5;

FIG. 7 is a view of main parts of an initial setting means according to another embodiment of the invention, and FIG. 8 (a),(b) are block circuit diagrams of a setting control means employed in the means of FIG. 7.

As shown in FIG. 1, the copying apparatus of the invention comprises document rest 1 for the support of documents to be copied. Neither the document rest 1 nor documents thereon are moved during copying. Documents to be copied are illuminated by a light source L positioned below and inclined to the document rest 1, whereby image rays of successive portions of a document on the document rest 1 are directed downwards through an aperture T, or similar known means, which is moveable horizontally, i.e., parallel to the document rest 1. These image rays are directed onto a mirror 2 which is inclined at an angle of 45° to the document rest 1, and is moveable parallel thereto. The light source, aperture, and mirror 2 are conveniently mounted on one and the same carriage which is moveable parallel to the document rest 1. The optical axis of the moveable mirror 2 coincides with that of a mirror 3 which lies parallel to and facing the mirror 2, and forms an angle of 90° with a mirror 4; the mirrors 3 and 4 being mounted on a common carriage which is moveable on a horizontal plane, i.e., parallel to the document rest 1. The optical axis of the moveable mirror 4 coincides with that of a fixed mirror 5 and with the lens axis of a lens 6, which is positioned between the mirrors 4 and 5. The fixed mirror 5 faces and is parallel to the moveable mirror 4, and is inclined at an angle of 45°, facing downwards, to a photosensitive material 7, on which copies of an original document may be produced, and which is moved at a speed V, on a horizontal plane below the mirror 5. Image rays from a document on the document rest 1 are therefore directed onto the first moveable mirror 2, transmitted by the mirror 2 to the second moveable mirror 3, transmitted by the mirror 3 to the third moveable mirror 4, transmitted by the mirror 4 through the lens 6 to the fixed mirror 5, and then directed by the fixed mirror 5 onto the copying material 7. As indicated in the drawing, the length of the optical path from the document to the lens 6 is the sum A, B, C, and D, wherein A represents the vertical distance from the document rest 1 to the mirror 2, B the horizontal distance from the mirror 2 to the mirror 3, C the vertical distance from the mirror 3 to the mirror 4, and D the horizontal distance from the mirror 4 to the lens 6. Similarly, the length of the optical path from the lens 6 to the copying material 7 is the sum of E, the horizontal distance from the lens 6 to the fixed mirror 5, and F, the vertical distance from the fixed mirror 5 to the copying material 7.

In the apparatus shown in FIG. 1 the lens 6 remains stationary during any one copying operation, but may be moved to different initial settings. The initial setting of the first mirror 2 is always the same, but the initial setting of the second and third mirrors 3, 4 may be changed. During copying, the first mirror 2 is moved past the document being copied at a speed which is in a set relationship to the speed at which the copying material 7 is moved past the location directly below the fixed mirror 5 which is always fixed at one position. In obtaining copies in this manner, general requirements for obtaining a copy of a document at a particular magnification, say m1, are that the mirrors 2, 3, 4, 5 and lens 6 be in an initial configuration, say C1, and that the first mirror 2 be moved at a speed V1, which is equal to V/m1 (V being the speed of the copying material 7), while the second and third mirrors 3 and 4 are moved at a speed ½ V1. During copying, the distance (E + F) remains unchanged, since the lens 6 and mirror 5 remain stationary, and the distance (A + B + C + D) remains the same, since the mirrors 2, 3, 4 move horizontally, the vertical distance A, C thus remaining unchanged, and the mirror 2 moves away from the mirrors 3 and 4 by a distance that is always equal to the amount the mirrors 3 and 4 move towards the lens 6, the sum (B + D) thus remaining the same. The initial configuration C1 should, of course, be such that the document on the document rest 1 and that portion of the copying material 7 vertically below the fixed mirror 5 be at conjugate points of the lens 6, and also the ratio of the document to lens 6 distance (A + B + C + D) to the lens 6 to copying material 7 distance (E + F) should be such as to produce a copy of the document at the required magnification $m1$ on the copying material 7. To obtain a copy of a document at another magnification, say $m2$, the mirrors 2, 3, 4, 5 and lens 6 should be set to another initial configuration, say C2, to obtain a suitable ratio of the distances from the document to the lens 6, and from the latter to the copying material 7, and the first mirror 2 should be moved at a speed V2, and the third and fourth mirrors 3 and 4 at a speed ½ V2, where V2 is equal to V$m2$. As noted earlier, the first mirror 2 is always set to the same initial position, and so, the mirror 5 being fixed and the vertical distances A and C being constant, a change from the initial configuration C1 to configuration C2 is effected by changing the initial settings of the mirror 3 and 4 assembly and of the lens 6, the mirrors 3 and 4 being moved from an initial setting position PI to an initial position P II, and the lens 6 being moved from an initial setting postion P1 to an initial position P2. The mirrors 3 and 4 and lens 6 are moved towards or away from one another, which presents the advantage that space requirements to effect a particular adjustment are minimum, and so permits a copying apparatus having a compact construction. Supposing, $m2$ to be smaller than $m1$, the initial setting C2 should be such that the ratio of the distance (A + B + C + D) to the distance (E + F) is higher than in configuration C1, the distances between the settings PI, PII and between the settings P1, P2 being dependent on characteristics of the lens 6 and on the relationship between magnifications $m1$ and $m2$. In general, conditions for obtaining copies of a document at different magnifications $m1$, $m2$, with the apparatus shown in FIG. 1, are $$V = m1 \cdot V1 = m2 \cdot V2$$
$$\Delta d = \frac{1}{2} \left\{ \frac{(1 + m2)^2}{m2} - \frac{(1 + m1)^2}{m1} \right\} f$$
$$\Delta L = (m1 - m2) f$$

wherein $\Delta d$ is the distance between the initial setting positions PI, PII of the mirrors 3 and 4, $\Delta L$ is the distance between the initial setting positions P1 and P2 of the lens 6, and $f$ is the focal length of the lens 6.

These conditions are met by the apparatus shown schematically in FIGS. 2 through 6, in which equipment housing and support of parts are omitted.

Referring to FIG. 2, the first mirror 2 is fixedly supported by a first carriage 8 with the light source. The second and third mirrors 4 and 5 are fixedly mounted on a second carriage 9, which is provided to the right of the first carriage 8. The first and second carriages 8 and 9 are slidably mounted on guide rods (not shown) which are fixedly supported in horizontal alignment in the equipment housing, and permit the first and second carriages 8 and 9 and mirrors 2 and 3 and 4 thereon to be moved parallel to the document rest 1. There are provided a pair of plates 11 and 21 which are in a generally vertical alignment and which are rigidly attached to the first carriage 8 and second carriage 9, respectively.

one end 10a of a cable line 10 is fixedly attached to the first carriage plate 11. The cable line 10 is led leftwards from the first carriage plate 11, wrapped three or four times round a drive pulley 12, which is rotatably provided at a certain position in the equipment housing, led rightwards from the drive pulley 12, and guided around a small pulley 14, which is rotatably mounted on a shaft 13 and that is fixedly supported in the equipment housing, and is to the right of the first and second carriages 8 and 9. From the pulley 14, the cable line 10 is led leftwards and the other end 10b thereof is in fixed or integral attachment to one end of a tension spring 15, whose other end is fixedly attached to the first carriage plate 11. The spring 15 serves to impart requisite tension in the cable line 10. During copying of a document, the drive pulley 12 is rotated counterclock wise in the drawing by a motor 30, in a manner described below, whereupon the cable line 10 draws the first carriage 8 leftwards. When copying of the document is completed, the first carriage 8 is drawn back to its original position by the action of a cable line 16.

One end 16a of the cable line 16 is fixedly attached to the first carriage plate 11. The cable line 16 is led rightwards from the 1st carriage plate 11 to a large diameter pulley 19, which is rotatably mounted on a shaft 17 fixedly supported in the equipment housing, adjacent to the small pulley 13. The cable line 16 is guided downwards around the large pulley 19, led leftwards from the pulley 19 to a pulley 20, which is rotatably mounted on a shaft 18 fixedly supported in the equipment housing, guided upwards and around the pulley 20 and led rightwards to a pulley 23. The pulley 23 is rotatably mounted on a shaft 22, which is fixedly attached to the second carriage plate 21. The cable line 16 is passed around the pulley 23, led leftwards therefrom, and past a pulley 29 which continuously presses downwards to impart tension to the cable line 16, and which is fixedly mounted on a rotatable take-up shaft 44. As shown in FIG. 4, after passing the pulley 29, the cable line 16 is cross-wound on a pulley 45, which is rotatably mounted on a shaft 46 fixedly attached to a swivel board 47, and the cable line 16 is then wound around the take-up shaft 44, to which the other end 16b of the cable line 16 is attached. The swivel board 47 may be moved to change the original configuration of the mirrors 3 and 4 and lens 6 from configuration C1 to configuration C2, or vice versa, as described in further detail below. For the moment, the description will proceed on the assumption that the mirrors 3 and 4 and lens 6 are initially held in configuration C1, to produce a copy of a document having a magnification $m1$.

Referring back to FIG. 2, one end 24a of a cable line 24 is fixedly attached to the second carriage plate 21. The cable line 24 led rightwards from the plate 21, guided around a pulley 26, which is rotatably mounted on a shaft 25 fixedly supported in the equipment housing, and the other end 24b thereon is in fixed, or integral attachment to one end of a tension spring 27. The other end of the spring 27 is fixedly attached to a plate 28 affixed to the equipment housing (not shown). Acting through the cable line 24, the spring 27 exerts a continuous rightwards-acting force on the second carriage 9. The cable line 16 being connected to the second carriage 9 through the pulley 23 and to the swivel board 47 (FIG. 4) through the pulley 45, the force of the spring 27 also exerts a continuous rightwards force on the swivel board 47, tending to cause the board 47 to pivot clockwise. The positions and sizes of the pulleys 12, 14, 19, 20, 29, and 26, and tension imparted to the cable lines 10, 16 and 24 are such that the free spans of all the cable lines 10, 16 and 24 are maintained substantially horizontal.

As noted earlier, counterclockwise rotation of the drive roller 12 by the motor 30, as shown FIG. 3, causes the first carriage 8 to be drawn leftwards by the cable line 10 against the resilient force of the spring 29. When the first carriage 8 is thus drawn leftwards, the second carriage 9 also is drawn leftwards by the cable line 16 since one end 16a of the cable line 16 is attached to the first carriage plate 11, and the cable line 16 passes around the pulley 23 mounted on the second moveable carriage plate 21. The other end 16b of the cable line 16, and the pulleys 19, 20 and 46 associated with the cable line 16 being in fixed locations, and the cable line 16 being looped around the pulley 23, the 2nd carriage 9 is drawn leftwards at half the speed of the 1st carriage 8. In other words, if the mirrors 2, 3 and 4 and lens 6 are initially in the configuration C1, copying material 7 is driven leftwards at a speed V, and the first carriage 8 is driven at a speed V1, the second carriage 9 is driven at a speed ½ V1, and a copy of a document at a magnification $m1$ is obtained, as described earlier. When the motor 30 is stopped, after a copy of the document has been obtained, the spring 27, acting through the cable line 24, draws the second carriage 9 rightwards, back to its original position, and the carriage 9, acting through the cable line 16, simultaneously draws the first carriage 8 back to its original position, the equipment thus being ready to obtain further copies of the same, or other documents, at the same magnification $m1$.

Referring now to FIG. 3(a), the motor 30, which is positioned in a lower left-hand portion of the equipment, drives a sprocket wheel 31 clockwise in the drawing. The sprocket wheel 31 supplies simultaneous drive from the motor 30 to two chains 38 and 39. The chain 39 is arranged in a generally vertical alignment, and drives a sprocket wheel 40. Rotation of the sprocket wheel 40 causes synchronous rotation of a gear wheel 41, which is fixedly and coaxially mounted on the same rotatory shaft as the sprocket wheel 40, both the sprocket 40 and gear 41 being rotated clockwise. The gear wheel 41 engages and drives a gear wheel 43, which is fixedly and coaxially mounted on the same rotatory shaft as a sprocket wheel 42 provided for driving the copying material 7. The copying material 7 is driven at a constant speed V by the sprocket wheel 43 and sprocket wheel 42 which are driven counterclockwise and the upper stretch of the copying material 7, which is that part thereof exposed to images reflected downwards by the fixed mirror 5 as shown in FIG. 1, is moved leftwards. The free span of the copying material 7 is sufficiently short, and the tension applied thereto is sufficient to ensure that the copying material 7 moves below the location of the fixed mirror 5 in a substantially horizontal line.

Still referring to FIG. 3(a), the chain 38 is disposed in a generally horizontal alignment and supplies clockwise drive from the motor 30 to a sprocket wheel 37. The dimensions of the sprocket wheel 37 are such that when the sprocket wheel 31 is driven at a suitable speed to drive the copying material 7 at the speed V, the peripheral speed of the sprocket wheel 37 is V1.

Referring to FIG. 3(b), the chain 38 may simultaneously drive a gear wheel 32, or the sprocket wheel 37 and a gear wheel 35. The gear wheel 32 is fixedly mounted on a shaft 32a which is coaxial, but not integral with a shaft 12a on which a gear wheel 33 and the abovementioned drive pulley 12 are fixedly mounted. The shafts 12a and 32a are coupled upon actuation of an electromagnetic clutch 34, provided between the sprocket wheel 32 and gear wheel 33, whereby the drive pulley 12 may be driven at the same rotatory speed as the gear wheel 32. The gear wheel 35 engages the gear wheel 33, and is fixedly mounted on a shaft 35a that is coaxial, but not integral with a shaft 37a, on which the sprocket wheel 37 is fixedly mounted. The shafts 35a and 37a are coupled upon actuation of an electromagnetic clutch 36, which is provided between the gear wheel 35 and sprocket wheel 37, whereby the gear 35 may be driven at the same rotatory speed as the sprocket 37. The drive pulley 12 is rotated anticlockwise and whether drive is supplied through the gear wheel 32 or the gear wheel 35.

The tooth ratio of the sprocket wheels 32 and 37 is chosen to be 1:1. Thus when the clutch 34 is engaged, and the clutch 36 is disengaged, while the copying material 7 is driven at a speed V, the gear wheel 12 is rotated counterclockwise at a peripheral speed v1, and the first carriage 8 (FIG. 2) is driven leftwards at this speed V1, by the cable line 10. At the same time, of course, the second carriage 9 is drawn leftwards at a speed ½ V1, as described earlier.

The tooth ratio of the gear wheels 33 and 35 is set at $m2:m1$. Thus, when the clutch 36 is engaged, and the clutch 34 is disengaged during the actuation of the motor 30, the gear wheel 33, and hence drive pulley 12, is driven at a peripheral speed V2, and the first carriage 8 and second carriage 9 are drawn leftwards at speeds V2, and ½ V2, respectively, while the copying material 7 is driven at the speed V. In other words, when clutch 34 is engaged, a copy of a document at a magnification $m1$ may be obtained, and when clutch 36 is engaged a copy of a document at a magnification $m2$ may be obtained. The clutches 34 and 36 are engaged upon actuation of micro switches 69 and 68 respectively, by a lens carriage 63 of FIG. 4, described below.

Reference is now had to FIG. 4, which shows means for setting the mirrors 3 and 4 and lens 6 in the initial configuration C1 or C2, to obtain copies of a document, or documents at magnification m1 or m2, respectively. Briefly, in the setting means shown, for initial configuration C1, the lens carriage 63, which supports the lens 6, is moved to a rightmost position P1, while the swivel board 47, which is connected with the cable line 16, is held in an upright position, whereby the second carriage 9 (FIG. 2) is held in initial setting position PI. For initial configuration C2, the lens carriage 63 is moved to a leftmost position P2, and the swivel board 47 pivots to the right, that is, towards the cable line 16, thus permitting the second mirror carriage 9 to be moved away from the first mirror carriage 8, to position P II. The swivel board 47 and lens carriage 63 are moved simultaneously upon actuation of a motor 52.

In greater detail, in FIG. 4, the motor 52 drives a gear 53. The motor 52 itself is actuated to supply forward or reverse drive to the gear 53 upon actuation of suitably identified switches (not shown) provided on the exterior of the copying apparatus. The gear 53 engages and drives a gear 54 which is fixedly mounted on a rotatory shaft 56 supported in the equipment housing. A gear 55 and drive pulley 57 are fixedly mounted on opposite ends of the shaft 56. The gear 55 engages and drives a gear 51, which is fixedly mounted on one end of a rotatory shaft 50 supported in the equipment housing. A cam 49 is fixedly mounted on the other end of the shaft 50, and contacts the swivel board 47, the cam 49 being located to the right of the board 47.

The board 47 is pivotally mounted on a shaft 48, which extends through an aperture in a lower portion of the board 47, and is fixedly supported in the equipment housing. The abovementioned pulley 45, around which the cable line 16 is cross-wound, is rotatably mounted on a shaft 46, which is fixedly attached to the board 41, at an upper location thereon. As described earlier, in reference to FIG. 2, since the cable line 16 is attached at one end 16b to the take-up shaft 44, and is passed around the pulley 23 mounted on the second mirror carriage 9, and the spring 27, acting through the cable line 24, exerts a continuous force tending to draw the mirror carriage 9 rightwards, the cable line 16, acting through the pulley 45, exerts a continuous force tending to pivot the board 47 clockwise. The degree to which the swivel board 47 may be pivoted clockwise by this force depends on the rotatory position of the cam 49 contacting the board 47. As shown in FIG. 4b, the cam 49 is in the form of a disk having a large radius portion 49a with a radius r1, and a small radius portion 49b with a radius r2.

In FIG. 5, when the cam 49 is rotated into a position in which the large radius portion 49a thereof contacts the swivel board 47, the board 47 may not be moved out of a substantially vertical alignment, as indicated by the solid line portion of FIG. 5. In this case, the second mirror carriage 9, although urged rightwards by the spring 27 (FIG. 2), may not move further rightwards than position PI, which is the correct initial location of the mirrors 3 and 4 on the second carriage 9 in order to obtain a copy of a document at a magnification $m1$. The initial position PI of the second carriage 9 must, of course, be such that a portion of a document, on the document rest 1, vertically above the first mirror 2 and the portion of the copying material 7 vertically below the fixed mirror 5 are at conjugate points of the lens 6. Any necessary adjustments to this initial position PI can be made by an adjustment dial 44a, for example, provided on the outside of the copying equipment, and connected to the take-up shaft 44, whereby the shaft 44 can be rotated to take up or let out a certain amount of the cable line 16, and so allow the second carriage 9 to be drawn rightwards.

As shown in the dotted line portions of FIG. 5, when the cam 49 is rotated into a position in which the small radius portion 49b thereof contacts the swivel board 47, the cable line 16 can pivot the board 47 clockwise to a certain degree, thus shortening the distance between pulleys 23 and 45 to be covered by the upper stretch of the cable line 16, and so permitting the second carriage 9 to be drawn rightwards by the force of the spring 27, to the initial setting position P II, which is the correct initial position of the 2nd carriage 9 for obtaining a copy of a document at a magnification $m2$.

Referring back to FIG. 4, when the cam 49 is rotated, the drive pulley 57 on the shaft 56 also is rotated. The drive pulley 57 carries a cable line 58 which moves the lens carriage 63. One end 58a of the cable line 58 is fixedly attached to a rod 64 which is affixed to the lens carriage 63. The cable line 58 is led from the rod 64, to and around a pulley 60, which is rotatably mounted on a shaft 59 fixedly supported in the equipment housing. From the pulley 60, the cable line 58 is led to the drive pulley 57, wrapped two or three times round the pulley 57, and then led to and around a pulley 62, which is rotatably mounted on a shaft 61 fixedly supported in the equipment housing. The other end 58b of the cable line 58 is in fixed or integral attachment to one end of a tension spring 65, whose other end is attached to the rod 64, and which serves to maintain requisite tension in the cable line 58. The lens carriage 63 supports the lens 6 in a correct alignment, and is itself supported by horizontal guide rods 70, which are fixedly supported in the equipment housing, and permit the lens 6 to be moved in a horizontal line towards or away from the fixed mirror 5. When the motor 52 is actuated so that the cam 49 is rotated to bring the large radius portion 49a thereof into contact with the swivel board 47, the drive pulley 57 is rotated clockwise in the drawing, and the lens carriage 63 is drawn rightwards to the initial setting position P1. When the lens carriage 63 reaches the position P1, a contact pin 67 mounted thereon contacts and actuates the abovementioned micro-switch 69. The micro-switch 69 controls a suitable circuit, which, upon actuation of the micro-switch 69, simultaneously stops the motor 52, and causes engagement of the clutch 36 shown in FIG. 3. The mirrors 3 and 4 are now in position PI, the lens 6 is in position P1, and when a start button, or similar means provided on the outside of the apparatus is pressed, and the motor 30 is actuated, the copying material 7 is driven at a speed V, while the first mirror 8 is driven at a speed V1 and the second mirror carriage 9 at a speed ½ V1. In other words, a copy of a document at magnification m1 can be obtained. To obtain copies of a document at magnification m2, a suitably identified push-button or similar means (not shown) provided on the outside of the apparatus, is pressed, whereupon the motor 52 is driven in reverse, the drive pulley 57 is driven counterclockwise, the lens 6 being drawn leftwards from the position P1 to the position P2, and at the same time, the cam 49 is rotated to bring the small radius portion 49b thereof into contact with the swivel board 47. When the lens reaches the position P2 a contact pin 66 mounted on the lens carriage 63 contacts and actuates the abovementioned micro-switch 68. The micro-switch 68 controls a suitable circuit which, upon actuation of the micro-switch 68, simultaneously stops the motor 52, and causes disengagement of the clutch 34 and engagement of the clutch 36. The mirrors 3 and 4 are therefore now in initial position P II, the lens 6 is in initial position P2, and when the motor 30 is actuated by pressing the start button the first mirror carriage 8 is driven at speed V2, the second mirror carriage is driven at speed ½ V2, and copies of a document at magnification m2 can be obtained. The diameter ratios of the various pulleys 53, 54, 55, 51 and 57 are made such that when the drive pulley 57 drives the lens carriage 63 from position P1 to P2, or vice-versa, the cam 49 is rotated 180°. The contact pins 66 and 67 on the lens carriage 63 may be adjustably mounted, in order to make it possible to change the exact lens carriage position at which the micro-switch 68 or 69 is actuated; in other words, to adjust the initial setting position P1 or P2 of the lens 6.

It is, of course, possible to modify the abovedescribed equipment in various ways without departing from the novel principles of the invention. For example, FIG. 6 (a), (b), (c) show modifications of means for initially setting the mirrors 3 and 4 to position PI or PII. In the means shown in FIG. 6 (a), the pulley 29 and take-up shaft 44 are omitted, and the end 16b of the cable line 16 is attached to a take-up reel 72, from which the cable line 16 is led rightwards, over a guide pulley 71, to and around the pulley 23 on the second mirror carriage 9, the disposition of the cable line 16 being otherwise as described earlier. The guide pulley 71 and take-up reel 72 both lie in line with the pulley 23, whereby the upper stretch of the cable line 16, from the pulley 23 to the reel 72, is normally substantially horizontal. The portion 16c of the cable line 16 lying between the guide pulley 71 and the take-up reel 72 may be contacted by a pulley 73 mounted on one end 74a of a swivel board 74. The swivel board 74 is positioned above the take-up reel 72 and rotatably mounted on a shaft 74c which is fixedly supported in the equipment housing (not shown). One end of a tension spring 75 is fixedly attached to the other end 74b of the board 74, and other end thereof is fixedly attached to a fixed portion of the equipment housing below the board 74. The spring 75 exerts a continuous force tending to pivot the board 74, counterclockwise in the drawing, and bring the pulley 73 out of contact with the cable line portion 16c. The cam 49, which has large and small radius portions 49a, 49b, as described above, and is rotated by suitable linkages connecting to the motor 52, is positioned above, and may contact the swivel board 74. When the cam 49 is rotated to a position in which the large radius portion 49a thereof contacts the board 74, the board 74 is pivoted clockwise against the force of the spring 75, and the pulley 73 on the end 74a thereof contacts and depresses the cable line portion 16c, as indicated by the solid line portions of FIG. 6(a). In this case, the top stretch of the cable line 16 must cover a greater distance, and the second mirror carriage 9 is therefore drawn into a more leftward position, which is initial setting position PI. When the cam 49 is rotated into a position in which the small radius portion 49b thereof contacts the board 74, the spring 75 may pivot the board 74 into an alignment in which the pulley 73 no longer contacts the cable line portion 16c, as indicated by the dotted line portions of FIG. 6(a), thus allowing the second mirror carriage 9 to be drawn rightwards by the cable line 24 and spring 27 (FIG. 2) to the initial setting position P II.

In FIG. 6(b), the end 16b of the cable line 16 is attached to the take-up reel 72, which is positioned in line with the pulley 23 on the second mirror carriage 9. The cable line 16 is led rightwards from the take-up reel 72, to and around the pulley 23, leftwards from the pulley 23, to and around the pulley 73 on the end 74a of the swivel board 74, to and around the pulley 19 and thence to the first carriage plate 11. In this modification, the pulley 20 is omitted, and the swivel board 74 is positioned in a generally upright position, the end 74a thereof and pulley 73 being uppermost. One end of the spring 75 is attached to the lower end 74b of the board 74, and the other end thereof is attached to a fixed portion of the equipment housing to the left of the board 74, whereby the spring 74 acts to pivot the board 75 clockwise, and move the pulley 73 towards the second mirror carriage 9. The cam 49 is positioned to the right of and may contact the board 74. When the large radius cam portion 49a contacts the board 74, the board 74 is pivoted slightly counterclockwise and the second mirror carriage 9 is moved to initial position PI, as indicated by the solid line portions of FIG. 6(b). When the cam small radius portion contacts the board 74, the board 74 is pivoted clockwise slightly, and the second mirror carriage 9 is drawn to initial position P II, as indicated by the dotted line portion of FIG. 6(b).

In FIG. 6(c), the pulley 71 is positioned so that the bottom thereof is level with the top of pulley 23 on the second mirror carriage 9, and the upper stretch of the cable line 16 extends in a horizontal line from the pulley 23 to the pulley 71, and from the pulley 71 is inclined upwards slightly, and leads to the pulley 73 of the swivel board 74, the cable line end 16b being attached to the pulley 73. The board 74 is in a generally upright position, tends to be pivoted clockwise by the spring 75, as described above, and is contacted by the cam 49, which may be rotated to different positions, whereby the upper stretch of the cable line 16 is drawn leftwards or allowed to move rightwards, and the second mirror carriage 9 is moved to the initial setting positions PI and PII, as indicated by the solid line portions and dotted line portions, respectively, in FIG. 6(b). In the modifications discribed in reference to FIG. 6 (a), (b) and (c) above, the take-up reel 72, or pulley 73 may be rotated by an externally provided means to take up or let out the cable line 16, in order to adjust the locations of the initial setting positions PI, PII of the second mirror carriage 9.

Reference is now had to FIG. 7, which shows another embodiment of the invention which makes it possible to obtain copies of original documents at four different magnifications $m1$, $m2$, $m3$ and $m4$.

As indicated in the drawing, the lens carriage 63 is transported by the cable line 58 upon actuation of the motor 52, in the same manner as described in reference to the first embodiment, and may be moved to four different positions P1, P2, P3 and P4, which are suitable locations for initial setting positions of the lens 6 for obtaining copies of documents at magnifications $m1$, $m2$, $m3$, $m4$, respectively. Micro switches S1', S2', S3' and S4' provided at the positions P1, P2, P3 and P4, respectively, are actuated by a pin, or similar means provided on the lens carriage 63, as the lens carriage reaches the positions P1, . . . P4. In this embodiment, there is provided a cam 49', which is driven simultaneously with the lens carriage 63, and is associated with the swivel board 47 in the same manner as described in reference to the first embodiment, but which has four different radius portions 49a, 49b, 49c and 49d, having radii $r1$, $r2$, $r3$ and $r4$ respectively. The radii $r1$, $r2$, $r3$ and $r4$ are such that when the cam portions 49a, 49b, 49c and 49d contact the swivel board 47, the second mirror carriage 9 is moved to positions which are suitable initial setting positions thereof in order to obtain copies of documents at magnifications $m1$, $m2$, $m3$ and $m4$, respectively, the cam portion 49a being brought into contact with the board 47 when the lens carriage 63 is at position P1, the cam portion 49b when the lens carriage 63 is at position P2, and so on. Associated with this second embodiment, there is also a clutch and gear assembly similar to that illustrated in FIG. 3(b), but which permits the pulley 12 to be driven at four different speeds V1, V2, V3 and V4, which are respectively selected upon actuation of manually operated switches S1, S2, S3, S4 provided on the outside of the apparatus, and are suitable speeds of the first mirror carriage 8 for obtaining copies of documents at magnifications $m1$, $m2$, $m3$ and $m4$, respectively.

The block diagram of control of the motor 52, to move the cam 49 and lens carriage 63, is shown in FIG. 8(a), and a suitable circuit is shown in diagram form in FIG. 8(b). As shown in FIG. 8(b), the motor control circuit C comprises lines L1, L2, L3 and L4 on each of which there is provided a battery, or other suitable voltage source, successively higher voltage sources being provided on the lines from L1 to L4. The lines L1 through L4 connect at one end to a common line. At their other ends the lines L1, L2, L3 and L4 respectively may be connected to a point $a'$ by the selector switches S1, S2, S3 and S4, which, as noted above, are provided externally on the copying apparatus, and also select the speed at which the first and second mirror carriages are driven. When any one switch S1 through S4 is actuated, the others remain unactuated. The point $a'$ is connected to a point $b'$ through two rectifier diodes A, B, which are in counter parallel arrangement, the diode A permitting current IA to flow from point $a'$ to point $b'$, and the diode B permitting current IB to flow from point $b'$ to point $a'$. The motor 52 is driven forwards by current IA, and in reverse by current IB. The point $b'$ may be connected through normally open contacts R1, R2, R3 and R4, respectively, to points on the lines L1, L2, L3 and L4 between the voltage sources thereon and the terminals to the switches S1, S2, S3 and S4. The normally open contacts R1, R2, R3 and R4 are closed upon actuation of the microswitches S1', S2', S3' and S4' (FIG. 7) respectively, i.e., when the lens carriage 63 is at the positions P1, P2, P3 and P4. Only one contact R1, . . . R4 at a time may be closed, and when closed, each contact R1, . . . R4 remains closed until actuation of another contact R1, . . . R4.

The action of the initial setting means shown in FIG. 7, and of the control circuit shown in FIG. 8(b) is as follows. Assume that copies of documents have been obtained at magnification $m2$, and that is next wished to obtain copies of documents at magnification $m3$, and subsequently at magnification $m1$. In this case, initially, the lens carriage 63 is at position P2, thereby closing the contact R2, and the cam portion 49b contacts the swivel board 47. The line L2 is connected to point $a'$ by selector switch S2, and to point $b'$ by the contact R2. Point $a'$ and $b'$ are therefore both connected to the same side of the same voltage source, which is on line L2, and so there is no current in the circuit, and motor 52 is not actuated. When it is required to obtain copies of documents at magnification $m3$ the selector switch S3 is actuated which connects line L3 to point $a'$, disconnects line L2 from point $a'$, and at the same time actuates the requisite clutch to cause the first carriage 8 to be driven at speed V3. The line L2, although no longer connected to point $a'$, remains connected to point $b'$, since contact R2 remains closed. Therefore, point $a'$ being connected to the higher voltage of the voltage source on line L3, and point $b'$ to the lower voltage source on line L2, there is a potential difference between the points $a'$, $b'$, and current IA flows from $a'$ to $b'$, and drives the motor 52 forwards. The lens carriage 63 is therefore moved from position P2 to position P3, and at the same time the cam 49 is rotated towards a position in which the cam portion 49c thereof is brought into contact with the swivel board 47. The cam portion 49c is brought into contact with the board 47 at the same time as the lens carriage 63 reaches position P3. At this time, the lens carriage 63 actuates the micro-switch S3' to close the contact R3, the contact R2 being simultaneously opened. The points $a'$ and $b'$ are now connected through the switch S3 and contact R3, respectively, to the same side of the voltage source on line L3, and so there is no potential difference therebetween. Current IA therefore stops, the motor 52 stops, the lens carriage 63 remains at position P2, and the cam portion 49c remains in contact with the swivel board 47, the second mirror carriage 9 thus being in a suitable initial setting position for obtaining copies of documents at magnification m3.

Subsequently, when it is required to obtain copies of documents at magnification m1, the switch S1 is actuated to connect the line L1 to the point a', whereupon the line L3 is simultaneously disconnected from point a', and the clutch for causing the first mirror carriage 8 to be driven at speed V1 is engaged. The point a' is now connected to the low voltage source on line L, but, the contact R3 remaining closed, the point b' is connected to the higher voltage source on line L3. Thus there is a potential difference between points a', b' which causes a current IB to flow from point b' to point a', and drive the motor 52 in reverse, whereby the lens carriage 63 is moved from position P1, and the cam 49 is rotated back from the position in which the cam portion 49c thereof contacts the board 47, towards a position in which the cam portion 49a thereof contacts the board 47. As the lens carriage 63 moves towards position P1, it comes to position P2 and actuates microswitch S2' to close contact R2 and simultaneously open contact R3. The point b' is therefore now conntected to the voltage source on line L3, which, however, is greater than the voltage source on line L1 connecting to point a'. Thus, there is still a potential difference to produce a current IB to actuate the motor 52. The lens carriage 63 therefore continues to be drawn towards position P1, and the cam 49 to be rotated, until the lens carriage 63 reaches position P1 and actuates microswitch S1', at which time the contact R1 is closed, contact R2 is opened, the motor 52 stops, since points a' and b' are connected to the same potential (supplied by the voltage source on line L1), the lens carriage remains in position P1, the cam portion 49a remains in contact with the board 47, and it is merely necessary to actuate a start button (not shown) provided on the apparatus to obtain copies of documents at magnification m 1. Externally, the selector switches S1 through S4 need not of course be in the form of individual switches, but may be conveniently provided in the form of a dial changeover switch. The controls of the copying apparatus thus need only be a changeover switch, for selecting the magnification at which it is required to obtain copies of a document, and a start switch.

As is clear from the above description, the present invention provides a copying apparatus which makes it possible to obtain copies of original documents at a plurality of magnifications, but which is simple in operation, requires no extra expensive parts such as lenses, and is compact in construction.

Although the present invention has been fully described by way of the preferred embodiments thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed is:

1. In a copying apparatus wherein image rays from a stationary original to be copied are directed at a certain magnification by a first carriage supporting a mirror and a lamp, a second carriage supporting at least one further mirror, and a lens carriage supporting a lens onto a photosensitive material moving at a certain speed, said second carriage being moved at half the speed of said first carriage, the length of the light path from the original to said lens carriage being thereby kept constant irrespective of the position of said first carriage, the improvement which comprises a means for shifting said lens carriage and said second carriage to positions corresponding to predetermined magnification, and a means for changing moving speeds of said first and second carriages in accordance with said magnification, said shifting means comprised of a single cam having a plurality of cam surfaces with each of said surfaces defining a shifting distance of said second carriage, a rotatable member mounted for rotation about an axis and positioned in contact with one of said surfaces of said cam, a first cable connecting said rotatable member and said second carriage, and a means interconnecting said cam with said lens carriage, whereby upon rotation of said cam said rotatable member rotates about its axis for moving said second carriage by said first cable while said lens carriage is being moved through said interconnecting means, both of said second carriage and said lens carriage thereby being moved to positions corresponding to said predetermined magnification, and said speed changing means being comprised of a plurality of clutch means operatively associated with a plurality of gears having different tooth ratios for controlling the moving speeds of said first and second carriages in accordance with said predetermined magnification.

2. The improved copying apparatus of claim 1 wherein said rotatable member is biased in a first direction by said first cable, said cam being positioned adjacent said rotatable member and preventing movement thereof when a largest cam surface contacts said rotatable member, said rotatable member pivoting in the first direction when a smaller cam surface is positioned adjacent said rotatable member.

3. The improved device of claim 1 further comprising first and second carriage plates respectively coupled to said first and second carriages, a plurality of pulleys operatively associated with said device, a first tension spring having one end coupled to said first carriage plate, a second cable, one end of said second cable connected to said first carriage plate, said second cable being operatively threaded through said plurality of pulleys, the other end of said second cable coupled to the free end of said first tension spring, one of said plurality of pulleys being coupled to a motor through said speed changing means, whereby activation of said motor draws said second cable in one direction, thereby drawing said first carriage in said one direction from a first position to a second position, said first cable further being coupled to said first carriage plate, said first carriage being returned to said first position from said second position by means of said first cable.

4. The improved copying apparatus of claim 3 further comprising a bi-directional motor, and wherein said interconnecting means is comprised of a first gear coupled to said motor, a first shaft, a second gear mounted on said first shaft and engaging said first gear, a third gear and a first pulley mounted on said first shaft for rotation therewith, a second shaft, a fourth gear engaging said third gear and mounted on said second shaft, said cam being mounted on said second shaft adjacent said rotatable member and controlling the amount of rotation thereof, a third cable, one end thereof operatively connected to said lens carriage, a tension spring coupled to said lens carriage and to the other end of said third cable, second and third pulleys mounted on opposite sides of said lens carriage, said third cable engaging said first, second and third pulleys, contact means extending from said lens carriage, and a plurality of detector means respectively positioned at said predetermined positions and operatively coupled to said motor for discontinuing operation thereof upon contact between one of said detector means and said contact means, whereby said lens carriage may be selectively shifted with said second carriage to the positions corresponding to predetermined magnification.

5. The improved device of claim 4 further comprising a further pulley and a take-up shaft coupled to said further pulley, the end of said first cable engaging said rotatable member being coupled to said take-up shaft, said further pulley being positioned to engage said first cable.

6. The improved device of claim 4 further comprising a take-up reel and a guide pulley, the end of said first cable engaging said rotatable member thereafter engaging said take-up reel and said guide pulley, said rotatable member being positioned above said take-up reel, a further tension spring coupled to said rotatable member, a further pulley coupled to said rotatable member and operatively engaging said first cable, said further tension spring biasing said further pulley away from said first cable, said rotatable member being maintained in position by said cam which prevents movement of said rotatable member when in one position.

7. The improved device of claim 4 further comprising a take-up reel, said first cable being coupled thereto, said rotatable member being positioned generally upright, a further pulley mounted on said rotatable member and engaging said first cable, and a further tension spring coupled to said rotatable member and biasing said rotatable member toward said second mirror carriage.

8. The improved device of claim 4 further comprising a further pulley coupled to said rotatable member and engaging said first cable, said rotatable member being positioned generally upright, and a further tension spring coupled to said rotatable member and biasing said rotatable member toward said second mirror carriage.

9. The improved device of claim 7 further comprising means for controlling said motor and operatively coupled thereto and to said detector means, said controlling means comprised of a forward/reverse switch coupled to said motor, a current control means coupled to said forward/reverse switch for controlling the current direction, a plurality of selector switches operatively coupled to said current control means and said detector means and a plurality of holding switches operatively coupled to said detector means and to said current control means, whereby the lens carriage may selectively be moved to one of said predetermined positions.

* * * * *